United States Patent [19]

Yamada et al.

[11] Patent Number: 4,770,508
[45] Date of Patent: Sep. 13, 1988

[54] CONVERSION LENS RELEASABLY ATTACHED BEHIND MASTER LENS

[75] Inventors: Yasuyuki Yamada, Tokyo; Yasuhisa Sato, Kanagawa; Hiroki Nakayama, Kanagawa; Kouji Oizumi, Kanagawa, all of Japan

[73] Assignee: Canon Kabushiki Kaisha, Tokyo, Japan

[21] Appl. No.: 898,314

[22] Filed: Aug. 20, 1986

[30] Foreign Application Priority Data

Aug. 22, 1985 [JP] Japan .................................. 60-184473

[51] Int. Cl.⁴ ...................... G02B 15/02; G02B 13/18; G02B 9/10
[52] U.S. Cl. .................................... 350/422; 350/432; 350/481
[58] Field of Search ................. 350/422, 432, 465, 481

[56] References Cited

U.S. PATENT DOCUMENTS

| 4,443,067 | 4/1984 | Owen, Jr. et al. | 350/432 X |
| 4,477,154 | 10/1984 | Sato | 350/465 X |

FOREIGN PATENT DOCUMENTS

| 3504626 | 8/1985 | Fed. Rep. of Germany | 350/422 |
| 0215618 | 12/1983 | Japan | 350/422 |

Primary Examiner—John K. Corbin
Assistant Examiner—Ronald M. Kachmarik
Attorney, Agent, or Firm—Fitzpatrick, Cella, Harper & Scinto

[57] ABSTRACT

A conversion lens for attachment to the rear of a master lens to increase the focal length of the entire system, includes a positive lens, and a negative lens positioned on the image side of the positive lens, wherein at least one of the lens surfaces of the positive lens and the negative lens is an aspherical surface.

8 Claims, 6 Drawing Sheets

F I G.9
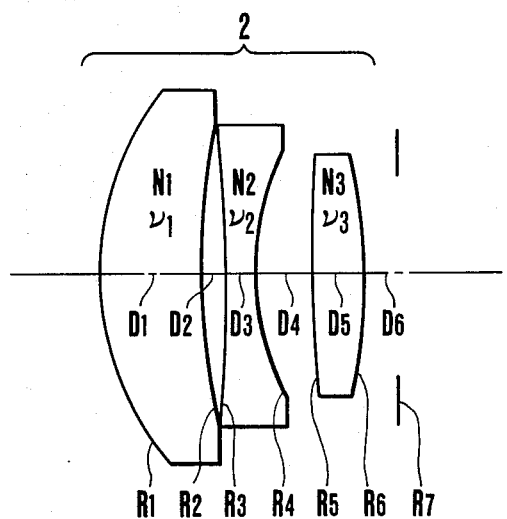
F I G.11
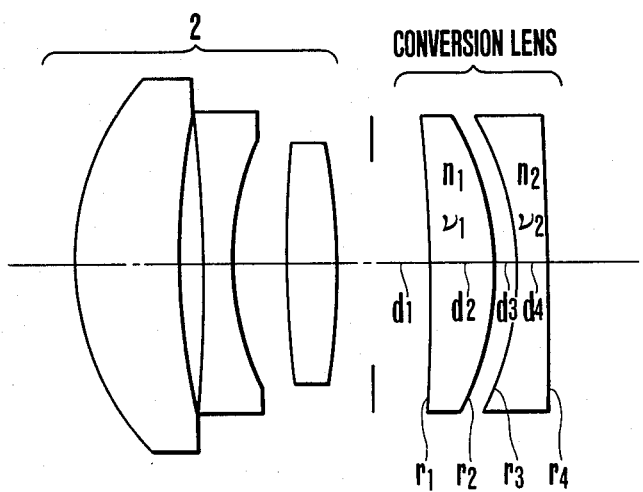

CONVERSION LENS RELEASABLY ATTACHED BEHIND MASTER LENS

BACKGROUND OF THE INVENTION

1. Field of the Invention

This invention relates to conversion lenses, and more particularly to conversion lenses releasably attached on the image side of a master lens system to change the focal length of the entire system. Still more particularly, it relates to conversion lenses of reduced size while still permitting the imaging performance to be improved, suited to be used in photographic cameras or video cameras.

2. Description of the Related Art

In the past, a wide variety of conversion lenses releasably attached on the object or image side of the master lens system to change the focal length of the entire system while maintaining constant the position of the focal plane of the entire system have been proposed. Of these, the so-called front conversion lenses which are attached to the object side of the master lens system tend to have an increased diameter. Therefore, it was difficult to achieve a reduction of the size of the entire system. Meanwhile, the so-called rear conversion lenses which are attached to the image side of the master lens system are advantageous in reducing the lens diameter as compared with the above-described front conversion lenses, but their aberration correction is difficult to achieve. Therefore, the number of lens elements had to be increased, and the total length of the lens tended to increase.

Japanese Laid-Open Patent Application No. Sho 54-97423 proposes a rear conversion method in which the conversion lens is inserted into a space after the master lens system has been axially moved forward to change the focal length of the entire system. But, because the number of lens elements is as many as six, the total length of the lens tends to increase.

Japanese Laid-Open Patent Application No. Sho 58-195817 discloses a conversion lens of relative small size in which the rear conversion method is also employed and, while a shortening of the back focal distance of the entire system is achieved, the focal length of the entire system is changed. But, the change of the focal length is 1.25 times. So the magnification change rate was not always sufficient.

In general, to achieve a high magnification change rate while maintaining a reduction in size of the entire system, the refractive power of the conversion lens may be strengthened. This method had drawbacks that too much aberration was produced, and particularly spherical aberration and Petzval sum were increased so that correction of curvature of field became difficult to perform.

Japanese Laid-Open Patent Application No. Sho 56-94318 filed by the assignee of the present invention discloses a rear conversion lens comprising two lens elements of positive and negative powers. The photographs taken with this lens attached to the master lens when enlarged in a high rate, sometimes impressed the viewer with a loss of the image quality.

SUMMARY OF THE INVENTION

An object of the invention is to provide a conversion lens employing the rear conversion method and having a good optical performance at a high magnification change rate while minimizing the size of the entire system.

A concomitant object of the invention is that among the various aberrations which give influence to the image quality, good correction of particularly spherical aberration is achieved.

BRIEF DESCRIPTION OF THE DRAWINGS

FIG. 9 is an optical section view of another master lens.

FIG. 11 is an optical section view of a sixth embodiment of the rear conversion lens attached to the master lens of FIG. 9.

DETAILED DESCRIPTION OF THE PREFERRED EMBODIMENTS

Figure 1A:
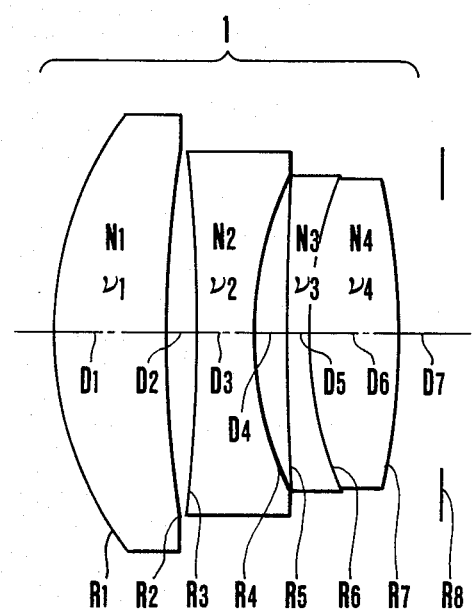
FIG. 1A is an optical section view of a master lens.
Figure 3:
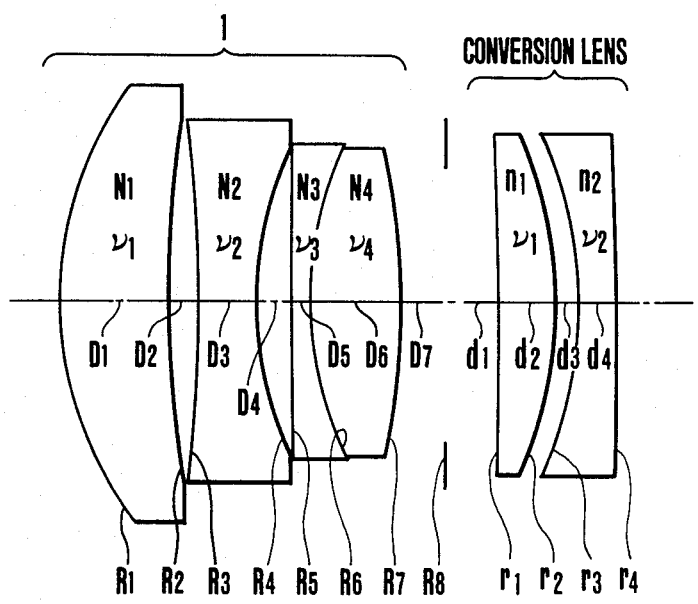
FIG. 3 is an optical section view of a first embodiment of the rear conversion lens according to the present invention attached to the master lens.
Figure 1B:
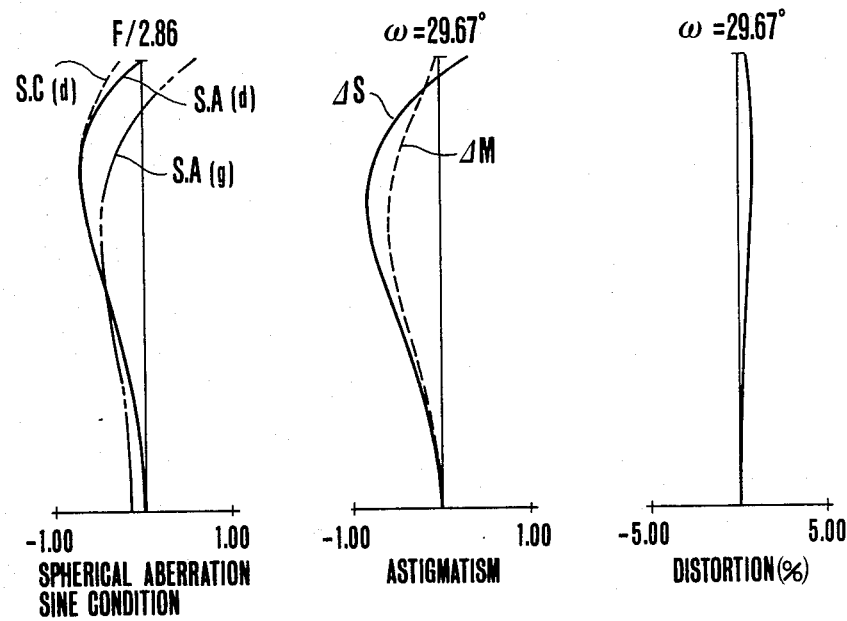
FIG. 1B is a graph of its aberration curves.
Figure 4:
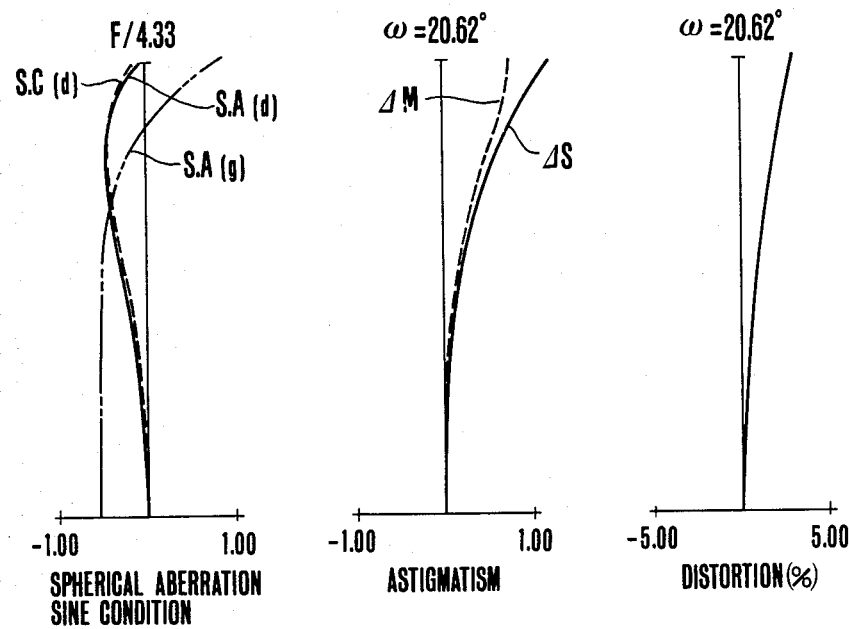
FIG. 4, FIG. 5, FIG. 6, FIG. 7 and FIG. 8 are graphs of the aberration curves of first, second, third, fourth and fifth embodiments respectively.
Figure 5:
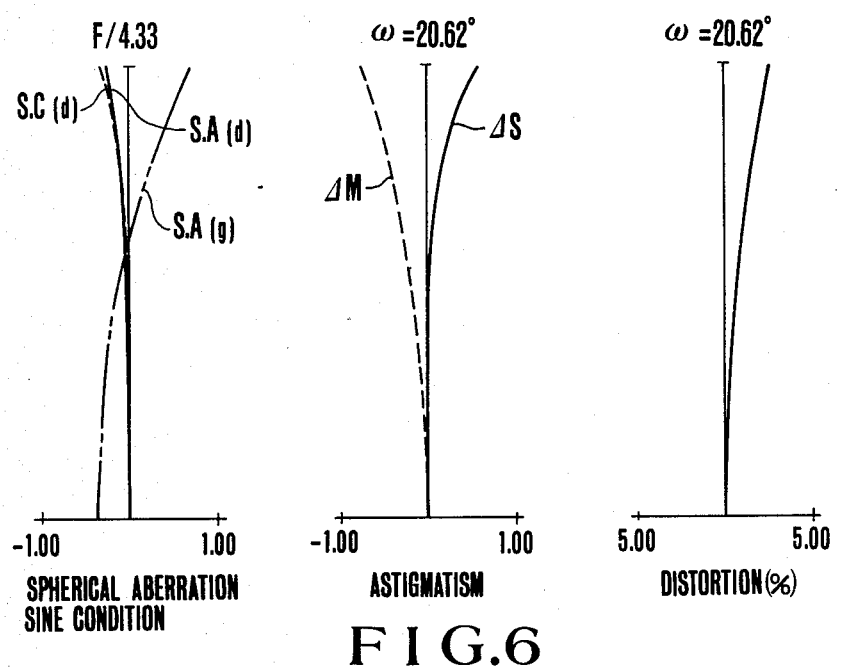
Figure 6:
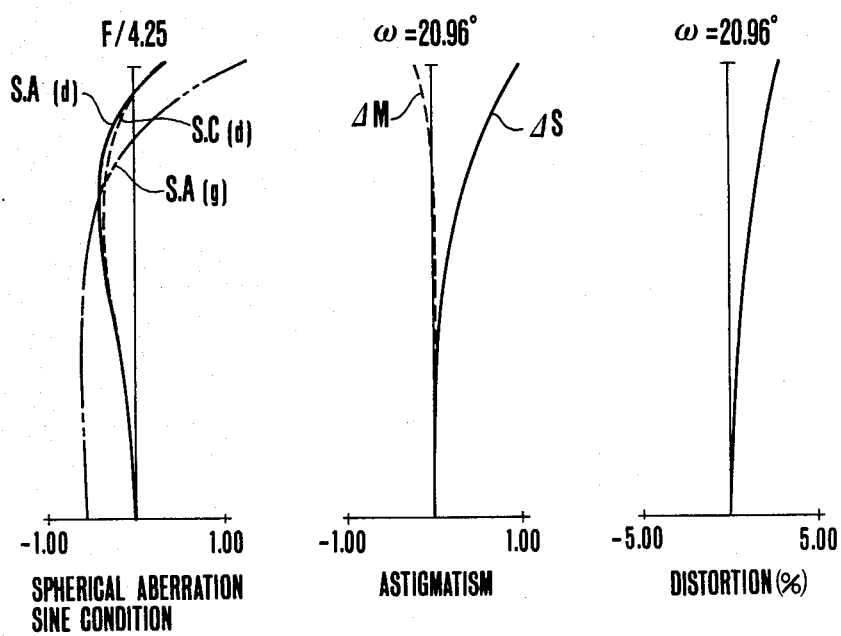
Figure 7:
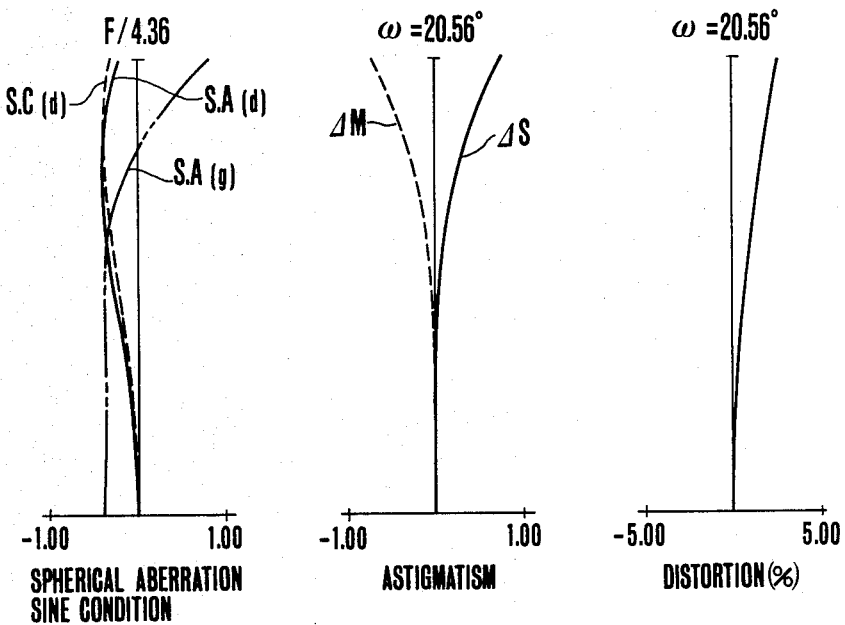
Figure 8:
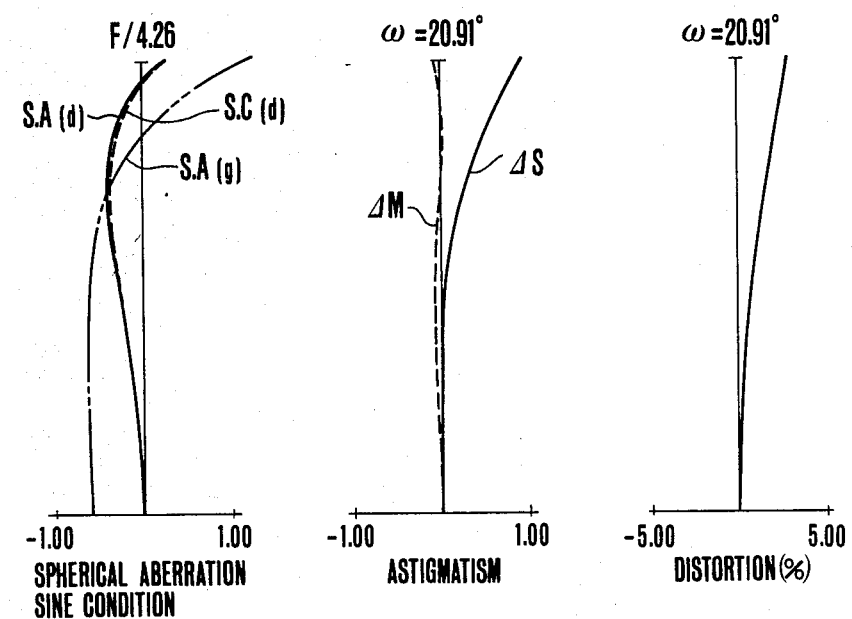
Figure 10:
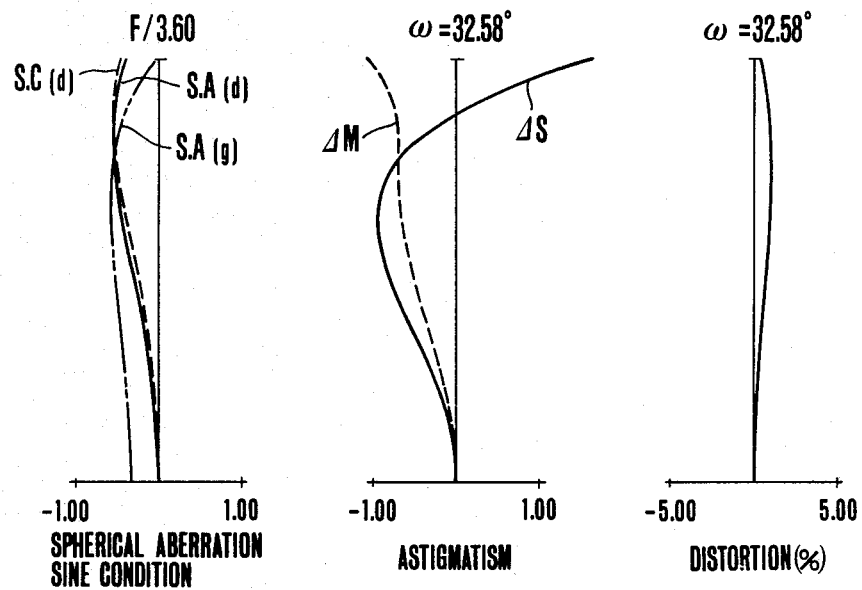
FIG. 10 is a graph of the aberration curves of the master lens of FIG. 9.
Figure 12:
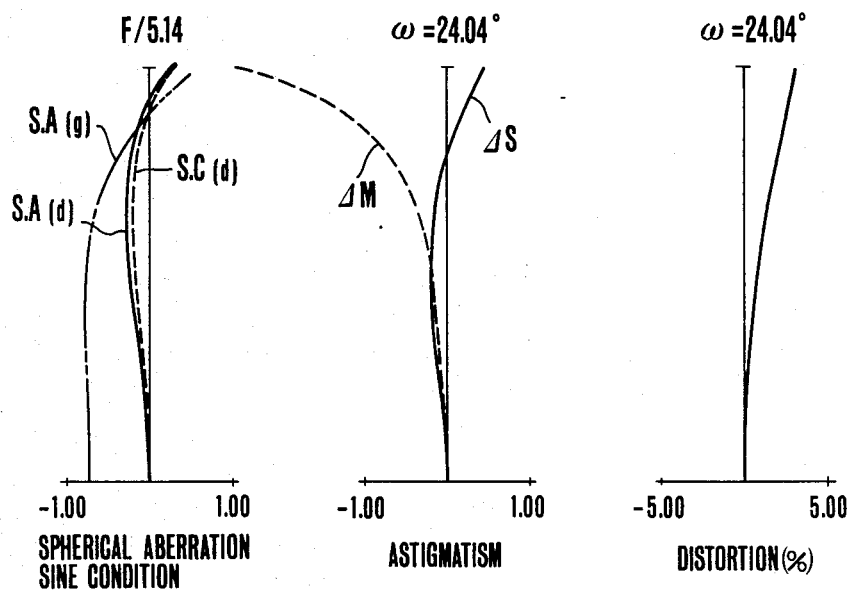
FIG. 12 is a graph of the aberration curves of the sixth embodiment.

In FIG. 1A and FIG. 9 there are shown respectively the master lens systems 1 and 2 to which the conversion lenses of the invention are to be attached. In FIG. 3 there is shown a combined system of the master lens 1 of FIG. 1A and a numerical example 1 of the conversion lens of the invention. FIG. 11 shows another combined system of the master lens 2 of FIG. 9 and a numerical example 6 of the conversion lens of the invention.

In the embodiment of the invention, the conversion lens comprises two lenses, or a first lens of positive refractive power and a second lens of negative refractive power, whereby the overall refractive power is made negative, and at least one lens surface is made aspherical with such a figuring that the positive refractive power becomes stronger as a whole from the center of the lens surface to the margin. This enables the size of the entire system to be reduced while nevertheless permitting good correction of the variation of aberrations, particularly spherical aberration against the increase of the focal length of the entire system by attaching the conversion lens. In general, when the conversion lens of negative refractive power is attached to the rear of the master lens system, the spherical aberration tends to be over-corrected. For this reason, the aspherical surface is formed to have such a shape that the positive refractive power becomes as a whole stronger toward the marginal portion. In other words, when it is the lens surface of positive refractive power, the positive refractive power is strengthened, and when it is the lens surface of the negative refractive power, the negative refractive power is weakened, so that the spherical aberration is well corrected.

It is to be noted, in the embodiments of the invention, when the conversion lens is attached, the distance from the first lens surface of the master lens system to the image plane is made to change the magnification.

Figure 2:
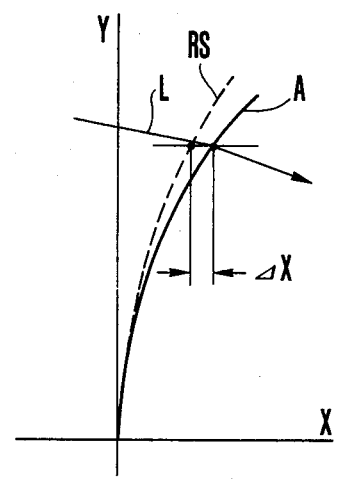
FIG. 2 is a graph for explaining the amount of deviation of an aspherical surface.

The conversion lens according to the present invention is achieved by satisfying the above-described various conditions. But, to properly correct particularly spherical aberration, the shape of the aspherical surface as depicted in FIG. 2 is set so as to satisfy the following condition:

$$1 \times 10^{-7} < \frac{|\Delta X|}{f} < 1 \times 10^{-3} \qquad (1)$$

where $\Delta X$ is the difference between the aspherical surface A and a reference spherical surface RS at a point of incidence of a marginal ray L of light flux that determines the F-number of the master lens system at full open aperture on the aspherical surface A. In other words, the difference between the aspherical surface and the extended surface of the sphere of the paraxial region, and f is the focal length of the entire system including the master lens system.

When the aspherical quantity becomes less than the power limit of the inequalities of condition (1), the advantage arising from the use of the aspherical surface is reduced so that the spherical aberration is insufficiently corrected. When the aspherical quantity is goes much beyond the upper limit, so that the affection of the aspherical surface is too strong, the spherical aberration increases in the negative sense. Therefore it is not desirable.

Also, in the invention, to minimize the Petzval sum to preserve good characteristics of the image plane over the entire area of the picture frame, it is preferred to satisfy the followiing condition:

$$n2 - n1 > 0.18 \qquad (2)$$

n1 and n2 are the refractive powers of the glasses of the first and second lenses respectively.

Because the conversion lens according to the present invention has a negative refractive power as a whole, when the conversion lens is attached, the Petzval sum is caused to increase to the negative direction. So, for the first lens, a glass having a refractive index n1 is selected, and for the second lens, a glass having a large refractive index n2 is selected, while the inequality of condition (2) is satisfied, thereby the Petzval sum is reduced as a whole.

When the difference between the refractive indices of both lenses decreases out of the inequality of condition (2), the Petzval sum does not become so small, and the curvature of field becomes difficult to properly correct.

Further, in the present invention, to well correct off-axis aberrations, particularly astigmatism, when the conversion lens is attached, it is preferred to set forth a condition as stated below:

$$0.8 < r4/f_R < 3.2 \qquad (3)$$

where r4 is the radius of curvature of the rear surface RA of the second lens, and $f_R$ if the focal length of the conversion lens. It should be pointed out here that it is preferable to decrease the upper limit till 2.8.

That is, when a diaphragm is arranged between the main lens system and the conversion lens, the last lens surface RA of the conversion lens is made to become near to the concentric circle toward the diaphragm, thereby the astigmatism is well corrected. When the radius of curvature of the lens surface RA grows stronger beyond the lower limit of the inequalities of condition (3), the astigmatism increases to the negative direction. When the radius of curvature weakens beyond the upper limit, other off-axis aberrations including astigmatism become difficult to correct in good balance.

It is to be noted, in the embodiments of the invention, the aspherical surface having the above-stated condition may be applied to two or more of the lens surfaces of the first and second lenses.

Also, when the diaphragm is provided in a space between the master lens system and the conversion lens, it is preferred that each lens surface of the first and second lenses is formed by a shape that turns the concave surface toward the diaphragm in order to correct particularly off-axis aberrations in good balance.

In the present invention, focusing with the conversion lens attached, may be performed either by moving the master lens system forward, or by moving the conversion lens rearward.

It is to be noted, the master lens systems to be described later are shown to be of the Tesaar type and the triplet type. But, the master lens system may be of any other types such as the Gauss type and telephoto type.

Next are shown numerical examples of conversion lenses of the invention and master lens systems to which the conversion lenses are attached. In the numerical examples, Ri or ri is the radius of curvature of the i-th lens surface counting from the front; Di or di is the i-th lens thickness or air separation counting from the front; Ni or ni, and vi are respectively the refractive index and Abbe number of the glass of the i-th lens element counting from front. Also, in the numerical examples of the conversion lenses, d1 is the distance from the diaphragm to the first lens surface of the conversion lens.

The shape of the aspherical surface in coordinates where X-axis is in the optical axis, and Y-axis in the direction perpendicular to the optical axis, with the direction in which light advances being taken as positive, is expressed by the following equation:

$$X = \frac{(1/R)Y^2}{1 + \sqrt{1 - (Y/R)^2}} + AY^2 + BY^4 + CY^6 + DY^8 + EY^{10}$$

where R is the radius of curvature of the paraxial region, and A, B, C, D and E are the aspherical coefficients.

In the numerical examples of the conversion lenses F, FNO, and $2\omega$ represent respectively, when attached to the master lens system, the focal length, F-number and angular field of the entire system.

Also, for remarking purposes, the values of the factors in all the conditions of the invention to all the numerical examples are listed in Table 1.

| Numerical Example 1 of the Master Lens System |
|---|
| F = 100.00    FNO = 1:2.86    $2\omega$ = 59.34° |

| | | | |
|---|---|---|---|
| R1 = 34.59 | D1 = 10.72 | N1 = 1.77250 | $v1$ = 49.6 |
| R2 = 109.66 | D2 = 3.09 | | |
| R3 = −158.80 | D3 = 5.27 | N2 = 1.72151 | $v2$ = 29.2 |
| R4 = 32.75 | D4 = 3.55 | | |
| R5 = 260.16 | D5 = 2.05 | N3 = 1.58144 | $v3$ = 40.7 |
| R6 = 38.41 | D6 = 8.58 | N4 = 1.80610 | $v4$ = 40.9 |
| R7 = −77.98 | D7 = 4.21 | | |
| R8 = ∞ (Stop) | | | |

| Numerical Example 2 of the Master Lens System |
|---|
| F = 100.00    FNO = 1:3.60    $2\omega$ = 65.15° |

| | | | |
|---|---|---|---|
| R1 = 30.75 | D1 = 10.45 | N1 = 1.77250 | $v1$ = 49.6 |

-continued

Numerical Example 2 of the Master Lens System
F = 100.00   FNO = 1:3.60   2ω = 65.15°

| | | | |
|---|---|---|---|
| R2 = 95.84 | D2 = 2.53 | | |
| R3 = −163.49 | D3 = 2.94 | N2 = 1.69895 | ν2 = 30.1 |
| R4 = 30.22 | D4 = 5.68 | | |
| R5 = 137.11 | D5 = 5.21 | N3 = 1.80610 | ν3 = 40.9 |
| R6 = −74.98 | D6 = 3.53 | | |
| R7 = ∞ (Stop) | | | |

Numerical Example 1
F = 151.43   FNO = 1:4.33   2ω = 41.23°

| | | | |
|---|---|---|---|
| | d1 = 5.27 | | |
| r*1 = −693.98 | d2 = 5.68 | n1 = 1.6727 | ν1 = 32.1 |
| r2 = −40.84 | d3 = 2.56 | | |
| r3 = −35.34 | d4 = 3.16 | n2 = 1.8830 | ν2 = 40.8 |
| r4 = −329.99 | | | |

Aspherical Coefficients for the Surface r*1:
A = 0
B = 3.907 × 10$^{-7}$
C = 2.214 × 10$^{-9}$
D = 1.730 × 10$^{-12}$
E = −1.173 × 10$^{-14}$

Numerical Example 2
F = 151.4   FNO = 1:4.33   2ω = 41.24°

| | | | |
|---|---|---|---|
| | d1 = 5.27 | | |
| r1 = −2010.91 | d2 = 6.11 | n1 = 1.5927 | ν1 = 35.3 |
| r*2 = −36.54 | d3 = 2.28 | | |
| r3 = −32.66 | d4 = 3.16 | n2 = 1.8410 | ν2 = 43.2 |
| r4 = −272.83 | | | |

Aspherical Coefficients for the Surface r*2:
A = 0
B = −5.540 × 10$^{-7}$
C = −4.067 × 10$^{-9}$
D = 8.787 × 10$^{-12}$
E = −1.641 × 10$^{-15}$

Numerical Example 3
F = 148.77   FNO = 1:4.25   2ω = 41.91°

| | | | |
|---|---|---|---|
| | d1 = 5.27 | | |
| r1 = −664.81 | d2 = 6.58 | n1 = 1.6727 | ν1 = 32.1 |
| r2 = −40.50 | d3 = 2.63 | | |
| r*3 = −35.53 | d4 = 3.16 | n2 = 1.8830 | ν2 = 40.8 |
| r4 = −348.20 | | | |

Aspherical Coefficients for the Surface r*3:
A = 0
B = 2.282 × 10$^{-7}$
C = 2.702 × 10$^{-9}$
D = −7.885 × 10$^{-12}$
E = 1.318 × 10$^{-14}$

Numerical Example 4
F = 152.41   FNO = 1:4.36   2ω = 41.0°

| | | | |
|---|---|---|---|
| | d1 = 5.27 | | |
| r1 = −997.49 | d2 = 6.11 | n1 = 1.5927 | ν1 = 35.3 |
| r2 = −35.93 | d3 = 2.36 | | |
| r3 = −33.04 | d4 = 3.16 | n2 = 1.8410 | ν2 = 43.2 |
| r*4 = −310.37 | | | |

Aspherical Coefficients for the Surface r*4:
A = 0
B = −2.859 × 10$^{-7}$
C = −1.651 × 10$^{-9}$
D = 5.726 × 10$^{-12}$
E = −1.126 × 10$^{-14}$

Numerical Example 5
F = 149.16   FNO = 1:4.26   2ω = 41.81°

| | | | |
|---|---|---|---|
| | d1 = 5.27 | | |
| r*1 = −724.96 | d2 = 5.68 | n1 = 1.6727 | ν1 = 32.1 |
| r2 = −40.82 | d3 = 2.56 | | |
| r*3 = −35.39 | d4 = 3.16 | n2 = 1.8830 | ν2 = 40.8 |
| r4 = −320.91 | | | |

Aspherical Coefficients

| For the Surface r*1 | For the Surface r*3 |
|---|---|
| A = 0 | A = 0 |
| B = 3.381 × 10$^{-7}$ | B = 9.225 × 10$^{-8}$ |
| C = 1.417 × 10$^{-9}$ | C = 4.169 × 10$^{-10}$ |
| D = 1.181 × 10$^{-12}$ | D = 1.621 × 10$^{-13}$ |
| E = −1.203 × 10$^{-14}$ | E = 8.726 × 10$^{-17}$ |

Numerical Example 6
F = 142.74   FNO = 1:5.14   2ω = 48.08°

| | | | |
|---|---|---|---|
| | d1 = 5.89 | | |
| r1 = −546.63 | d2 = 6.54 | n1 = 1.5927 | ν1 = 35.3 |
| r2 = −38.36 | d3 = 2.65 | | |
| r3 = −34.99 | d4 = 3.53 | n2 = 1.8410 | ν2 = 43.2 |
| r*4 = −229.11 | | | |

Aspherical Coefficients for the Surface r*4:
A = 0
B = −1.765 × 10$^{-7}$
C = −9.791 × 10$^{-10}$
D = −5.048 × 10$^{-13}$
E = 6.717 × 10$^{-16}$

TABLE 1

| Numerical Example No. | Aspherical Surface | Factors in Conditions | | |
|---|---|---|---|---|
| | | 1 $|\Delta X|/f$ | 2 n2 − n1 | 3 r4/f$_R$ |
| 1 | r1 | 1.127 × 10$^{-4}$ | 0.2103 | 1.946 |
| 2 | r2 | 1.278 × 10$^{-4}$ | 0.2483 | 1.602 |
| 3 | r3 | 4.032 × 10$^{-4}$ | 0.2103 | 2.013 |
| 4 | r4 | 3.390 × 10$^{-5}$ | 0.2483 | 1.850 |
| 5 | r1 | 8.490 × 10$^{-5}$ | 0.2103 | 1.842 |
| | r3 | 1.326 × 10$^{-5}$ | | |
| 6 | r4 | 8.768 × 10$^{-6}$ | 0.2483 | 1.186 |

According to the present invention, by employing the rear conversion method, lenses of prescribed form and an aspherical surface or surfaces, a conversion lens that enables the size of the entire system to be reduced while still permitting a great increase in the magnification change rate and good optical performance can be achieved.

What is claimed is:

1. A conversion lens for attachment to the rear of a master lens whereby said master lens is adapted to form a photographic image, to increase the focal length of the entire system, said conversion lens comprising:
   a positive lens; and
   a negative lens positioned on the image side of said positive lens, wherein at least one of the lens surfaces of said positive lens and said negative lens is an aspherical surface, satisfying the following condition:

$0.8 < r4/f_R < 3.2$ where r4 is the radius of curvature of the rear surface of said negative lens and $f_R$ is the focal length of said conversion lens.

2. A conversion lens according to claim 1, wherein said aspherical surface has a shape determined so as to give the reference spherical surface progressively stronger positive refractive powers toward the margin of the lens.

3. A conversion lens according to claim 2, wherein the shape of said aspherical surface satisfies the following condition:

$$1 \times 10^{-7} < \frac{|\Delta X|}{f} < 1 \times 10^{-3}$$

where $\Delta X$ is the axial deviation between said aspherical surface and said reference spherical surface at a point of incidence of the marginal ray of the beam that determines the F-number of said master lens at full open aperture, and f is the overall focal length of said master lens and said conversion lens.

4. A conversion lens according to claim 1, wherein said positive lens has a rear surface convex toward the rear, with the radius of curvature of said rear surface being smaller than the radius of curvature of a front surface thereof, and said negative lens has a front surface concave toward the front, and a rear surface convex toward the rear, with the radius of curvature of said front surface being smaller than the radius of curvature of said rear surface.

5. A conversion lens according to claim 4, satisfying the following condition:

n2−n1>0.18 where n1 and n2 are the refractive indices of said positive and said negative lenses respectively.

6. A conversion lens according to claim 1, wherein said positive lens has a rear surface convex toward the rear with the radius of curvature of said rear surface being smaller than the radius of curvature of a front surface thereof, said negative lens has a front surface concave toward the front with the radius of curvature of said front surface being smaller than the radius of curvature of a rear surface thereof, and the shape of said aspherical surface is determined so as to give said reference spherical surface progressively stronger positive refractive powers toward the margin of said lens.

7. A conversion lens according to claim 6, wherein the shape of said aspherical surface satisfies the following inequalities:

$$1 \times 10^{-7} < \frac{|\Delta X|}{f} < 1 \times 10^{-3}$$

where $\Delta X$ is the deviation in a direction parallel to the optical axis between said aspherical surface and said reference spherical surface at a point of incidence of the marginal ray of the beam that determines the F-number of said master lens at full open aperture, and f is the overall focal length of said master lens and said conversion lens.

8. A conversion lens for attachment to the rear of a master lens whereby said master lens is adapted to form a photographic image, to increase the focal length of the entire system, said conversion lens comprising:

a positive lens, wherein said positive lens has a rear surface convex toward the rear, with the radius of curvature of said rear surface being smaller than the radius of curvature of a front surface thereof;

a negative lens positioned on the image side of said positive lens, wherein said negative lens has a front surface concave toward the front, and a rear surface convex toward the rear, with the radius of curvature of said front surface being smaller than the radius of curvature of said rear surface, and wherein at least one of the lens surfaces of said positive lens and said negative lens is an aspherical surface, said conversion lens satisfying the following condition:

0.1<r4/$f_R$<2.8 where r4 is the radius of curvature of the rear surface of said negative lens and $f_R$ is the focal length of said conversion lens.

* * * * *

UNITED STATES PATENT AND TRADEMARK OFFICE
CERTIFICATE OF CORRECTION

PATENT NO. : 4,770,508

DATED : September 13, 1988

INVENTOR(S) : Yasuyuki Yamada, et al.

It is certified that error appears in the above-identified patent and that said Letters Patent is hereby corrected as shown below:

COLUMN 2

Line 4, change "give influence to" to --influence--.

Line 58, change "of positive" to --of the positive--.

COLUMN 3

Line 19, change "power" to --lower--.

Line 21, change "sperhical" to --spherical--.

Line 22, delete "is".

Line 23, change "affection" to --effect--.

COLUMN 4

Line 29, change "from front." to --from the front.--

Signed and Sealed this

Twenty-seventh Day of June, 1989

*Attest:*

DONALD J. QUIGG

*Attesting Officer*    *Commissioner of Patents and Trademarks*